March 11, 1930. S. O. WHITE 1,750,292
TRANSMISSION GEAR
Filed Feb. 21, 1927

INVENTOR.
Samuel O. White,
BY
Hood + Hahn.
ATTORNEYS

Patented Mar. 11, 1930

1,750,292

UNITED STATES PATENT OFFICE

SAMUEL O. WHITE, OF MUNCIE, INDIANA, ASSIGNOR TO WARNER GEAR COMPANY, OF MUNCIE, INDIANA, A CORPORATION OF INDIANA

TRANSMISSION GEAR

Application filed February 21, 1927. Serial No. 169,687.

My invention relates to improvements in transmission gearing and particularly transmission gearing for use in driving automobiles and like vehicles.

It has for one of its objects that of reducing the gear noise in transmissions of this type. I have found from experience and experiment that one of the causes of gear noises and particularly the gear noise in automobile transmissions, is due to the moving off from their pitch lines of the gears. This is frequently due to a slight springing of the shaft, and more particularly the main drive shaft on which certain of the gears of the transmission are mounted. Such a springing of the shaft permits of only a slight movement of the gears but this slight movement is such as to throw the gears off their pitch lines to such an extent as to cause the gears to become noisy.

Another contributing cause to the noise in automobile transmissions is the vibration of the walls of the transmission case which tend to amplify the noise generated by the gears themselves.

In my present invention I have provided means for preventing the springing of the transmission shaft, without enlarging the shaft beyond commercial possibilities and for eliminating to a large extent the vibration in the walls of the transmission case.

Figure 1:
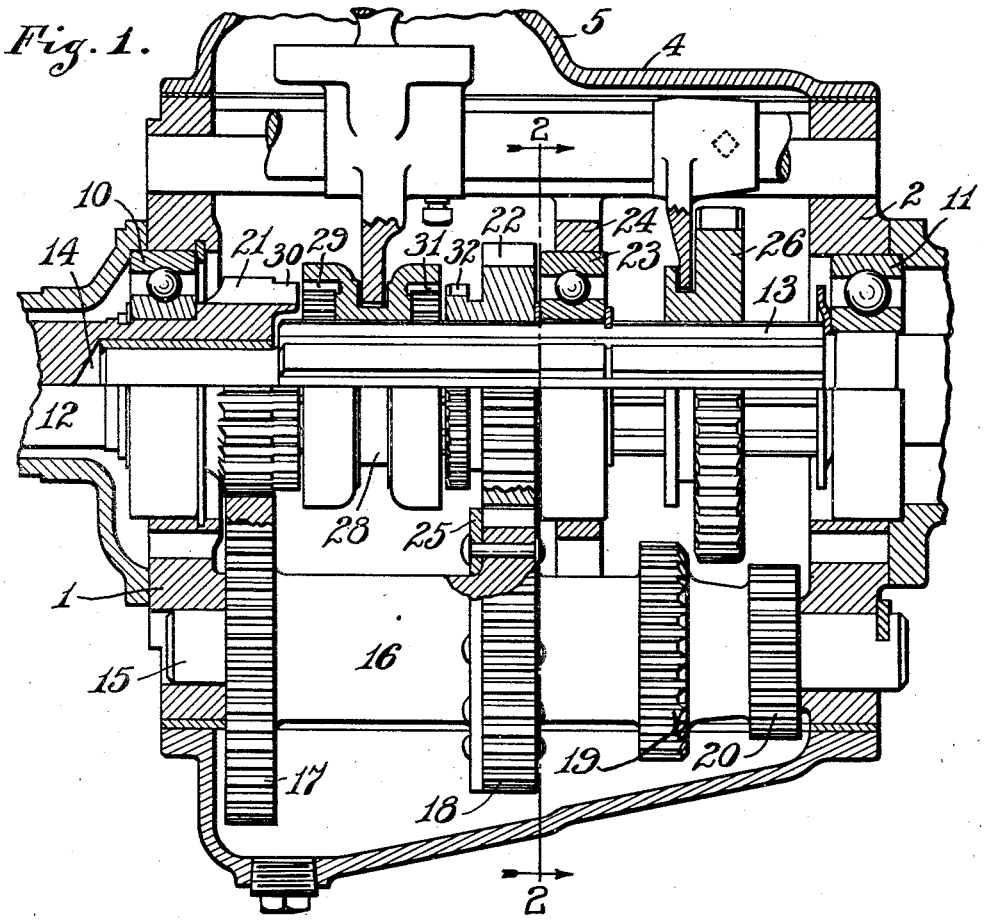
Figure 2:
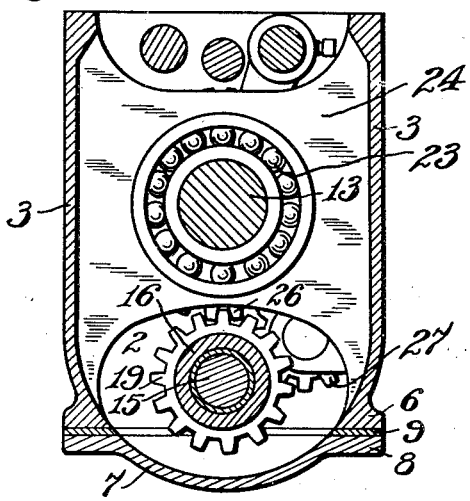

For the purpose of disclosing my invention I have illustrated one embodiment thereof in the accompanying drawings in which Fig. 1 is a longitudinal section of a transmission embodying my invention;

Fig. 2 is a transverse section taken on the line 2—2 of Fig. 1.

In the embodiment illustrated I provide a transmission case having end walls 1 and 2 and side walls 3. A cover plate 4 closes the top of the case and is provided with an extension 5 which provides means for mounting the usual shifting rod of a transmission gearing. The bottom of the transmission casing is open and surrounding the opening is an annular thickened flange 6. For closing the bottom opening I provide a bottom closure 7 having a corresponding annular thickened flange 8 the face of which meets the face of the flange 6, a suitable gasket 9 being inserted between the meeting faces for rendering the joint oil tight. This cover plate, like the plate 4, may be secured in position by suitable bolts or machine screws. The end walls 1 and 2 are provided with alined openings adapted to receive ball bearings 10 and 11 respectively for the rear end of the drive shaft 12 and for the driven shaft 13. The driven shaft 13 projects into and through the casing and has its forward end bearing in a recess 14 in the rear end of the drive shaft 12. Below the shafts 12 and 13 the end walls 1 and 2 of the transmission casing are provided with alined openings adapted to receive the ends of a counter-shaft 15 which carries a counter-shaft hub 16 provided with a plurality of gears 17, 18, 19 and 20 varying in diameter. The gear 17 is adapted to mesh with a gear 21 on the end of the drive shaft 12 and preferably formed integrally therewith. It will be noted that this gear 21 lies very closely to the bearing 10. The gear 18 is adapted to mesh with a floating gear 22 rotatably mounted on the shaft 13 and immediately to the rear of this gear 22 is provided a ball bearing 23, for the shaft 13, which bearing is mounted in a web or transversely extending wall 24 extending between the two side walls 3 of the gear casing and practically dividing the casing into two compartments. The gear 22 abuts against the revolving race-way of the ball bearing 23 which prevents movement towards the rear, on the part of this gear 22. This gear it will be noted, is in constant mesh with the gear 18 and to prevent forward movement of the gear 22 the gear 18 is provided with an annular band 25 on its face, which band in diameter is substantially equal to the diameter of the gear 18 so that the band will provide means for preventing the gear 22 from sliding forwardly, the gear 18 being prevented from any longitudinal movement by its relation on the hub 16. A sliding gear 26 is splined on the shaft 13 between the ball bearing 23 and the end wall 2 and this gear is adapted to be moved into mesh with the gear 19 for low speed drive or with the gear 27 in turn meshing with the gear 20 for reverse drive.

A clutch member 28 is splined on the forward end of the shaft 13 and is provided with internal clutching teeth 29 adapted to be moved into mesh with clutching teeth 30 on the drive shaft 12 to directly connect the drive shaft 12 and driven shaft 13 and is likewise provided with a series of internal clutch teeth 31 adapted to mesh with clutch teeth 32 on the hub of the gear 22 for connecting the gear 22 to the shaft 13 and thereby establish a second speed drive for the transmission.

The gears 26 and clutch member 28 are operated by the usual sliding forks adapted to be manipulated by a transmission rod handle as is usual in this type of transmission gearing.

It will be noted that due to the arrangement of the ball bearing 23, in a transverse wall intermediate of the ends of the transmission casing, not only have I provided means for preventing the load from springing the two gears 18 and 22 apart and have thus eliminated the gear noise at this point, but I have also provided means for dividing the transmission casing into two compartments and thereby prevented vibration in the side walls of the casing and thus further eliminated noise.

This bearing 23 is not only closely adjacent to the gear 22 but when the gear 26 is in mesh with the gear 19 the bearing is likewise in a position to prevent any springing of the shaft under the load between these two gears. The bearing 10 prevents a springing of the shaft 12 under the load between the gears 17 and 21 and the bearing 11 takes care of the shaft 13 at the rear wall of the casing. It is therefore apparent that the shafts 12 and 13 are held at all danger points against springing.

The removable cover plate 7 provides a means for assembling the counter-shaft hub 16 and its associated gears in the transmission casing from the bottom and the heavy lip 6 surrounding the bottom edge of the walls of the transmission casing also aids in the elimination of vibration in the walls of the transmission casing.

I claim as my invention:

1. In an automobile transmission the combination with a transmission casing, of co-axial driving and driven shafts mounted in said casing, bearings in the end walls thereof for said shafts, a drive gear on said driving shaft adjacent a bearing in the end wall of the casing, a counter-shaft mounted in said casing, a gear on said counter-shaft meshing with said drive gear, a second gear on said counter-shaft, a gear on said driven shaft meshing with said second gear on the counter-shaft and mounted intermediate of the end walls of the casing, a transverse wall intermediate of the end walls of the casing and connecting the side walls thereof, a bearing for said driven shaft mounted in said intermediate wall and receiving the axial thrust in one direction of the gear mounted on the driven shaft, an annular rim on the side face of the second meshing gear on the counter-shaft adapted to receive the axial thrust of the driven shaft gear in the opposite direction and means for causing said driven shaft to be driven from the drive shaft directly or through said gears.

2. In an automobile transmission, a combination with a transmission casing, of co-axial driving and driven shafts mounted in said casing, bearings in the end wall of said casing for said shafts, a driving gear on the driving shaft adjacent a bearing in the end wall of the casing, a transverse wall intermediate of the end walls of the casing spaced apart from the top and bottom walls of the casing and connected to the side walls of the casing throughout the height of said walls, a bearing for said driven shaft mounted in said transverse wall, a driven gear mounted on said driven shaft adjacent said bearing, a counter-shaft mounted in said casing below said co-axial shafts, a sleeve on said counter-shaft extending substantially the length of the casing and having formed thereon gears, one adapted to mesh with the gear on said driving shaft and another adapted to mesh with the gear on the driven shaft and a removable bottom cover for said casing.

In witness whereof, I, SAMUEL O. WHITE, have hereunto set my hand at Muncie, Indiana, this 18th day of February, A. D. one thousand nine hundred and twenty seven.

SAMUEL O. WHITE.